July 19, 1966  O. BROCKELMANN ETAL  3,261,106
METHOD AND DEVICE FOR EFFECTING HEAT EXCHANGE
Filed March 4, 1965  2 Sheets-Sheet 2

Inventors:
Otto Brockelmann
Erich Hatje
Reinhold Asel
By: Spencer & Kaye
Attorneys United States Patent Office 3,261,106
Patented July 19, 1966

3,261,106
METHOD AND DEVICE FOR EFFECTING
HEAT EXCHANGE
Otto Brockelmann, Moers, Erich Hatje, Rheinhausen, and Reinhold Asel, Dornap, Germany, assignors to Beteiligungs- und Patentverwaltungs-Gesellschaft mit beschrankter Haftung, Essen, Germany, and to Rheinisch-Westfalische Kalkwerke Aktiengesellschaft, Dornap, Germany
Filed Mar. 4, 1965, Ser. No. 437,018
Claims priority, application Germany, Mar. 7, 1964, B 75,785
14 Claims. (Cl. 34—20)

The present invention relates to a method and a device for cooling hot granular bulk material, particularly for effecting cooling by allowing the material to fall through a shaft having air-permeable walls through which a gaseous coolant, such as air, may be allowed to flow at the same time that the material is falling through the shaft.

In conventional heat exchange devices, an air stream flows through the granular material to be cooled transversely to the direction of flow of the latter. The period during which the air is in contact with the material is thus relatively short, in the conventional method, preventing efficient heat exchange from taking place. A very large volume of air is therefore necessary to cool the granular material.

The heat transferred to the coolant air from the material is often utilized as combustion air for a furnace located in front of the heat exchanger. If the volume of air needed to obtain a low outlet temperature of the granular material is greater than the volume of air needed for combustion, the surplus air exhausts through an outlet chimney into the atmosphere. To keep the exhaust air losses as low as possible, the volume of coolant air provided is often only the minimum amount absolutely necessary to bring the material to the desired outlet temperature. The fact that the granular material almost always flows from the furnace into the heat exchanger at a point such that it hits the peak of the cone formed in the flowing material may cause variations in the density of the material within the shaft. This means that regions where the density is greater are cooled less than regions of lesser density, since the former offer greater resistance to the flow of air. This means that in regions of greater density, undue thermal stresses will be set up in the shaft, which will eventually damage the shaft.

It is therefore an object of the present invention to provide a method and device for cooling hot granular materials which overcome the disadvantages of the prior art.

It is a further object of the present invention to provide a method and device for cooling hot granular material wherein a gaseous coolant flows several times transversely through the falling granular material.

These objects, as well as others, are achieved according to the invention wherein granular bulk material is allowed to fall under the force of gravity within a shaft having air-permeable walls, and coolant air is passed along a meandering path having portions within the shaft, and portions outside the shaft, the portions within the shaft extending substantially transversely to the flowing granular material and the flow of coolant outside the shaft being substantially upwardly, against the flow of the material.

Thus, the coolant flows through the bulk material in such a way as to move in a direction opposite that of the bulk material when it is outside the shaft and in a direction transverse to the flow of material when it is in the shaft. Since the coolant air preferably flows through the granular material several times, the volume of air required is reduced and at the same time, the amount of heat regained increases, because the temperature of the air leaving the heat exchanger is higher, while heat loss through the exhaust air diminishes.

According to a further feature of the invention, the temperature, quantity and pressure of the coolant air can be adjusted. This assures optimum operation of the device.

Additional objects and advantages of the present invention will become apparent upon consideration of the following description when taken in conjunction with the accompanying drawings in which.

Figure 1:
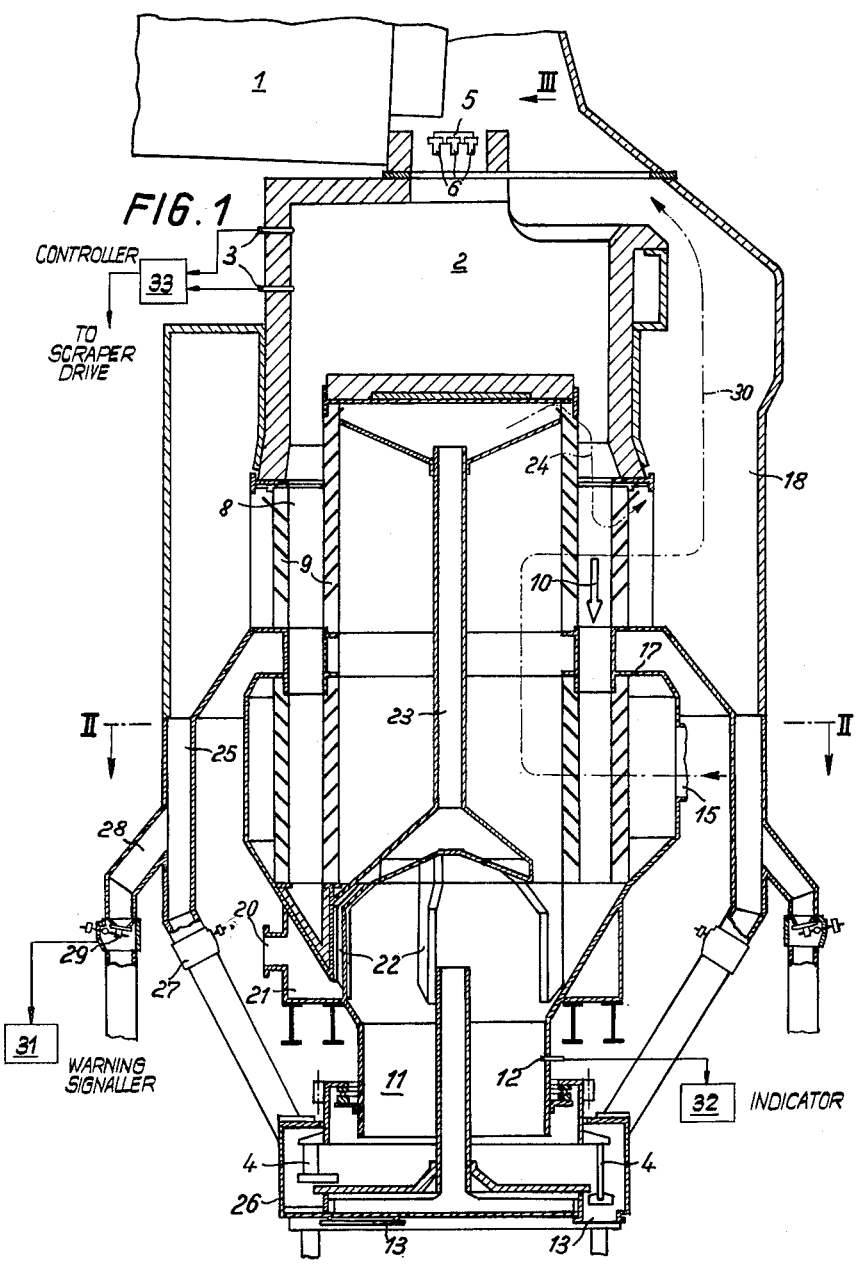
FIGURE 1 shows a cooling device in longitudinal section taken on the line I—I in FIGURE 2.
Figure 2:
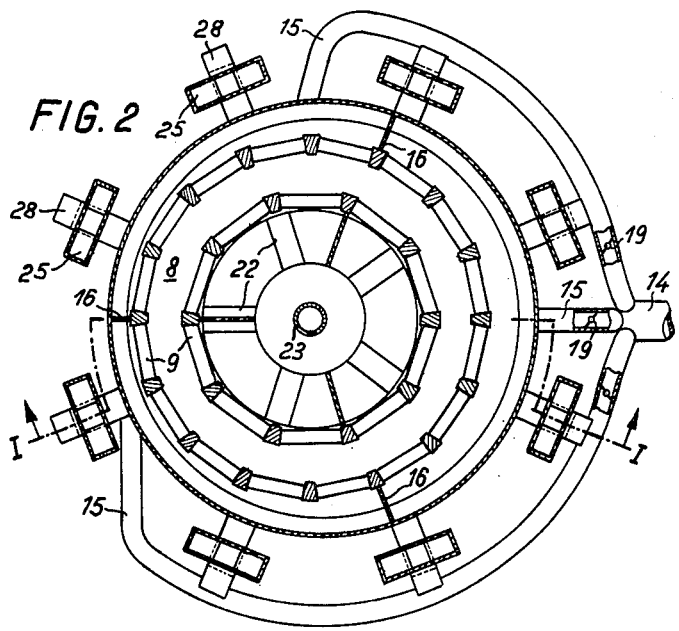
FIGURE 2 is a cross-sectional view taken along the line II—II in FIGURE 1.
Figure 3:
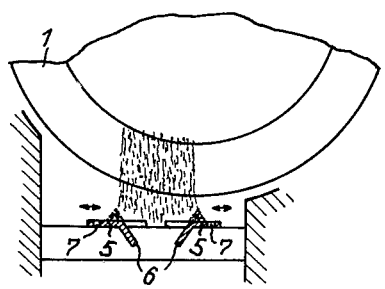
FIGURE 3 is a partial sectional view looking in the direction of the arrow III in FIGURE 1.

Referring to the drawings, the angular bulk material falls from a furnace 1 into a chamber 2. In the chamber 2, timing contacts 3 are provided for controlling the speed of the scraper 4 provided at the lower end of the heat exchanger for regulating discharge of the material therefrom. This speed in turn governs the length of time that the material remains in the chamber 2, in such a way that the peak of the conical mass of material formed therein is always located between the timing contacts. Above the chamber 2, there are two guide plates 5, each of which has a series of extensions 6 extending substantially in a common plane. The plates 5 may be moved closer or further from each other, for reasons to be described. To facilitate sliding of the plates, bore holes 7 are provided therein. Leaving the chamber 2, the material enters a substantially circular shaft 8, having air-permeable walls 9 through which air can flow freely. The material falls downward (in the direction of the arrow 10) under the effect of gravity through space 11 between shaft 8 and scraper 4, into which temperautre sensing devices 12 extend. The material is finally expelled through the discharge outlet 13, by means of the scraper 4.

The coolant air, entering through main duct 14, flows via three inlet ducts 15 into a coolant air jacket 18 which is subdivided by guide walls 16 and 17. Throttle valves 19 are provided in the inlet ducts 15 to control the volume of coolant air. The cool air stream flows through the granular material, as indicated by the dash-dot line 30, and then into the furnace 1, as combustion air. Another cool air stream flows through a further inlet duct 20 into an annular chamber 21. From chamber 21, it flows through channels 22, through a centrally disposed duct 23, and finally through the granular material, along the path indicated by dash-out line 24.

Any dust which finds its way into cooling jacket 18 is conducted to the discharge device 26 through ducts 25. These ducts 25 are equipped with screw-type valves 27. Branch ducts 28, in which pendulum valves 29 are located, discharge any granular material which gets into the duct system 25.

As has been shown, a device constructed according to the principles of the invention is built in such a way that the coolant air jacket provided around the shaft is subdivided by guide walls. According to a further feature of the invention, as has been shown, the coolant air is fed into the air jacket through at least three inlet ducts 15, which are distributed about the circumference of the jacket, in order to obtain uniform cooling of the material.

According to a particularly advantageous embodiment of the invention, a chamber for the heat treatment of the granular material is provided above the heat exchange shaft. The material emerging from this chamber is exposed to a stream of cool air as soon as it reaches the shaft. This is of advantage since rapid cooling of the granular material takes place in upper region of the shaft, which is the hottest. This substantially reduces wearing of the shaft.

According to still a further feature of the invention, it has been shown that at least one slidable guide plate, having parallel extensions, may be provided above the chamber 2. The parallel extensions of the several guide plates then form a funnel to guide the granular material into the chamber. Each guide plate is preferably made of heat-proof material. The guide plates may furthermore be moved, merely by sliding them, in such a way as to prevent the granular material flowing from the furnace to the heat exchanger from always hitting at the same point, so as to prevent the formation of regions of varying density in the material.

A timing contact for the chamber may be provided for controlling the speed of the scraper, which controls discharge of the material from the device. The length of time that material stays in the chamber may thus be regulated.

According to a further feature of the invention, as has been seen, temperature sensing devices extend into the space provided between the shaft 8 and the scraper 4. This provides an immediate warning when the material fails to reach the desired outlet temperature, so that the proper adjustments for repairs can be made.

Ducts in which screw-type valves 27 are located communicate between the air jacket and the discharge device to remove any dust entering the air jacket. These ducts each have a branch duct to discharge any of the granular material that gets into the duct system. A pendulum valve located in each branch duct signals as soon as any material passes through it. The screw-type valves are opened at intervals to discharge the ducts. The volume of the ducts between the screw-type valves and the points where the branch ducts 28 branch off is designed sufficiently large so that the accumulated dust remains below the level of the branching-off point. If, however, the shaft should be damaged by improper operation of the device, so that hot granular material enters the ducts, such material will eventually overflow and actuate the pendulum valves, which provides a warning signal via a signaller 31, for example. Steps can then be taken to prevent further damage to the shaft.

If material at too high a temperature enters the space 11 between shaft 8 and scraper 4, due to damage to the inner part of the shaft, the temperature sensing devices 12 which are located in this space will provide instant indication, for instance through an indicator 32. Contacts 3 for controlling the height of the cone of material within the chamber 2 may be connected through a controller 33 for controlling the drive for the scraper.

Contacts 3 may, for example, be radioactive measuring devices consisting of a source of radiation and a radiometer. Such a radioactive measuring device is described in the German printed application (Deutsche Auslegeschrift) 1,123,631. The contacts 3 may also be light sources that function in conjunction with light-sensitive control devices. Such an arrangement is known from the Austrian patent application 202,291. In the case of rays capable of being reflected, e.g. light rays, the light-sensitive control device can be placed on the same side of chamber 2 as the contacts 3.

It will be understood that the above description of the present invention is susceptible to various modifications, changes and adaptations, and the same are intended to be comprehended within the meaning and range of equivalents of the appended claims.

What is claimed is:

1. A method for cooling hot granular bulk material falling under the force of gravity within a shaft having air-permeable walls, said method comprising the step of passing coolant air along a meandering path having portions within said shaft and portions outside of said shaft, the portions within said shaft extending substantially transversely to the flowing granular material, and the flow of coolant outside of said shaft being substantially upwardly.

2. A method as defined in claim 1, including the step of adjusting the temperature, quantity, and pressure of the coolant air from optimum heat exchange.

3. A device for effecting heat exchange between hot granular bulk material and coolant air, said device comprising, in combination: shaft means for providing a path for a downwardly flowing stream of hot granular material, said shaft means having air-permeable walls; and means for passing coolant air along a meandering path having portions within said shaft means and portions outside of said shaft means, the portions within said shaft means extending substantially transversely to the flowing granular material and the flow of coolant outside of said shaft means being substantially upwardly.

4. A device as defined in claim 3, wherein said coolant passing means is an air jacket, said air jacket including guide walls subdividing the jacket into a plurality of flow channels.

5. A device as defined in claim 4, including means for feeding coolant air into said jacket, said means including at least three inlet ducts distributed around said jacket for providing a uniform supply of air thereto.

6. A device as defined in claim 5, including means forming a chamber above said shaft for heat treating said granular material.

7. A device as defined in claim 6, including means forming at least one guide plate above said chamber, said guide plates being slidable toward and away from each other in a substantially horizontal plane.

8. A device as defined in claim 7, wherein each of said guide plates has a plurality of extensions, the extensions of each guide plate extending substantially parallel to the other extensions of the same guide plate, the extensions of said guide plates forming a funnel for guiding the hot granular material.

9. A device as defined in claim 6, including means for discharging the granular material from the device, and contact means provided in said chamber for governing the rate of operation of said discharge means, whereby the length of time spent by the material in said chamber may be controlled.

10. A device as defined in claim 9, including temperature sensing means provided between said shaft and said discharge means for sensing the temperature of the material at said means.

11. A device as defined in claim 10, wherein said discharge means includes a scraper for discharging said granular material.

12. A device as defined in claim 5, including a plurality of ducts extending downwardly from said air jacket communicating said jacket with said discharge means for removing accumulated dust from the air jacket, and valve means for closing off each of said ducts.

13. A device as defined in claim 12, including a branch duct branching off from each of said ducts between its respective valve means and said jacket, and a pendulum valve in each of said branch ducts for signalling the overflow of any material piled up above said valve means into said branch ducts.

14. A device as defined in claim 3, wherein said shaft means is annular in cross-section, and said walls are louvered to be air-permeable.

References Cited by the Examiner

UNITED STATES PATENTS

| | | | |
|---|---|---|---|
| 2,861,353 | 11/1958 | Lellep | 34—61 |
| 3,175,302 | 3/1965 | Retali | 34—20 |

WILLIAM J. WYE, *Primary Examiner.*